United States Patent Office 3,434,044
Patented Mar. 18, 1969

3,434,044
**NUCLEAR PRECESSION WELL
LOGGING METHOD**
Paul E. Baker, Anaheim, Stanley B. Jones, Whittier, and
Delmar O. Seevers, Fullerton, Calif., assignors to
Chevron Research Company, a corporation of Delaware
Original application Feb. 17, 1953, Ser. No. 337,384, now
Patent No. 3,213,354, dated Oct. 19, 1965. Divided and
this application Sept. 22, 1958, Ser. No. 762,291
U.S. Cl. 324—.5          2 Claims
Int. Cl. G01r 33/08

This invention relates to a method and apparatus for differentiating substances by their nuclear magnetic resonance properties and particularly to a logging apparatus for locating hydrogenous fluids and distinguishing between water and oil in the formation around a bore hole. This application is a division of the copending application Ser. No. 337,384 for "Analytical Device," filed Feb. 17, 1953 now patent No. 3,213,354.

The problem of distinguishing water and oil within the earth is an importance one in oil technology. Once an oil well is drilled in a place where oil is expected to be found, there remains the problem of determining at what depth the well reaches an oil-containing formation. According to the prior art of which we are aware, a well is usually drilled to a depth of a few thousand feet, and an electric log is made of the well. Such a log measures resistivity and self-potential within the formation at the sides of the well. The most common liquid in the formations around a well bore is brine, which has a low resistivity compared to oil. An electric log is therefore interpreted on the assumption that a high resitivity indication at a known level within the well indicates a minimum of salt water. If a strong self-potential also exists at that level, it is assumed that the formation is permeable and that there is a possibility of an accumulation of producible oil at that level. Accordingly, if geological data gained from an examination of the chips which come to the surface in the process of drilling the well do not negate the presence of oil at this point in the well, it is assumed, in the absence of other data, that oil has been found and an effort is made to produce oil at this level. However, it is well known that variations in permeability of a formation, the salinity of the formation water and geology of the formations may radically affect resistivity and self-potential. It is apparent, then, that electric logs are ambiguous, since they measure only electrical characteristics of the formations through which the well has been drilled. These characteristics are not a necessary concomitant of oil.

Accordingly, it is an object of our invention to provide a logging method for the direct location of hydrogenous fluids within a formation.

It is a further object of our invention to ascertain the type of hydrogenous fluid present, and, specifically, to ascertain whether or not oil is present within the earth on the basis of the difference between the nuclear magnetic resonance characteristics of oil and water within the earth.

It is another object of our invention to provide a method and apparatus for determining the relaxation time of hydrogen nuclei of impure liquids.

It is a further object of our invention to provide a method and apparatus for differentiating oil and water on the basis of a difference in the relaxation time of the hydrogen nuclei of liquids within the earth.

It is another object of our invention to measure the nuclear magnetic resonance frequencies of hydrogen nuclei subject to the earth's magnetic field when the nuclei are present within hydrogenous fluids contained in the formation surrounding a bore hole.

It is a further object of our invention to provide method and apparatus for determining the presence of both water and oil within a formation surrounding a bore hole and separately identifying the presence of oil by measurements of nuclear magnetic resonance frequencies of hydrogen nuclei present in the formation fluids.

It is another object of our invention to ascertain by nuclear magnetic resonance methods whether or not oil is intermingled with the water present within a porous formation surrounding a bore hole.

It is another object of our invention to distinguish the various separate identifying nuclear magnetic resonance frequencies of hydrogen nuclei subject to the polarizing action of the earth's magnetic field present within a mixture of hydrogenous liquids contained by an extended sample completely external to and surrounding the electrical system used for exciting and measuring the nuclear magnetic resonance signals.

It is another object of our invention to distinguish the various identifying nuclear magnetic relaxation times of hydrogen nuclei in hydrogenous fluids contained in an extended sample completely external to and surrounding the electrical system used for exciting and measuring the nuclear magnetic resonance signals.

A specific object of our invention is to distinguish oil from water by measuring the values of the resonance frequencies, the splitting of the resonance frequencies, or the band width of the resonance frequencies.

In order to explain our invention, it is necessary to set forth in a brief fashion the elementary nuclear theory on which our method is based. An atom consists of a small, heavy, positively charged center called the nucleus surrounded by a relatively extensive diffuse cloud of electrons. The nucleus carries a positive charge equal to the negative charge of the external electrons and has a spin or angular momentum which varies with the nature of the nucleus. The hydrogen nucleus, for example, has an angular momentum $$a = \frac{h}{4\pi}$$

where $h$ is the well known Planck's Constant. In this sense, the nucleus, which in the case of the hydrogen atom is a proton, acts like a small gyroscope. The proton's charge and spin give rise to its characteristic magnetic moment, $\mu$, which is a measure of the proton's tendency to line up with a magnetic field. While the nucleus of the hydrogen atom consists of a single proton, nuclei of other atoms contain more than one proton, together with varied numbers of neutrons. Some nuclei do not have a spin and, hence, a magnetic moment, although they do contain varying numbers of protons. Our invention involves only those nuclei possessing magnetic moments, and especially protons.

In substances on which our invention is to be employed, the nucleus is not affected solely by an external magnetic field. Rather, the total field which acts on a nucleus is the sum of the external fields plus a local field peculiar to the nucleus under study. The local field is affected by the proximity of other nuclei and electrons. The effective magnetic field acting on one nucleus is different from that acting on other nuclei in the same sample. Consequences of these facts will be discussed more fully in later portions of this application.

In the absence of an external magnetic field, the nuclei of any sample of material are randomly oriented in space. When an external magnetic field is impressed on the sample, the nuclei are subjected to a torque proportional to their magnetic moments and tend to align themselves with the magnetic field. In the case of protons, the magnetic moments can align themselves either in the direction of the field or in the direction opposed to the field, but the protons are in the lower energy state if aligned in the direction of the field. Accordingly, a few more of the protons will align themselves with the field than will align themselves against the field.

According to classical theory, the nuclear resonance process may be visualized in the following manner: In the presence of a magnetic field, the nuclei do not merely swing into position with the field, but tend to precess around the field. In this, the nuclei resemble a gyroscope which is acted on by the earth's gravitational field. The earth's gravitational field exerts a torque on the gyroscope tending to cause the gyroscope to align itself with the earth's gravitational field. This torque on the gyroscope causes precession about the direction of the earth's gravitational field as the gyroscope seeks a position in the direction of the earth's gravitational field. Analogously, those nuclei which have a spin and associated magnetic moment tend to precess about the direction of the external magnetic field as they seek a position parallel to the field. This precession is in response to the torque exerted on their magnetic moments. The orderly precession of the nuclei is interrupted by thermal agitation and effect of adjacent precessing nuclei. The effective magnetic field on each nucleus is a combination of the external magnetic field and the resultant magnetic field due to the combined effect of the magnetic fields of adjacent charged particles. The proximity of the charged particles to a given nucleus varies with time and tends to interfere with the precession and to prevent rapid alignment of the nuclei with the magnetic field.

The natural frequency of precession of nuclei within an external magnetic field is determined by the nature of the nuclei and the strength of the magnetic field. This natural frequency is called the Larmor frequency. The Larmor frequency is $$\omega_L = \frac{\mu}{a} H$$

H is the field at the position of the nucleus and is the vector sum of the magnetic field applied externally and the magnetic fields of adjacent charged particles. The ratio of $\mu$ to $a$ is commonly denoted by the symbol $\gamma$ and is called the gyromagnetic ratio of the particular nucleus in question. $\gamma$, then, determines the precessional frequency of nuclei for a given external magnetic field.

Nuclei precessing about a magnetic field are equivalent in some respects to rotating magnetic dipoles and as such are capable of inducing a signal in a coil. Nuclei which are precessing about a magnetic field are, in general, oriented randomly with respect to a predetermined direction perpendicular to the field. Thus, a pickup coil which receives a signal due to the precession of one nucleus receives an equal and opposite signal from some other nucleus. The macroscopic effect is a complete cancelling out of signals from individual nuclei. An adjacent pickup coil can receive no signal from the precessing nuclei unless there is a precessing macroscopic moment.

A number of methods have been found for causing the nuclei to precess in phase to provide a precessing macroscopic moment. One method is disclosed in our invention and will be described later, although our invention is not limited thereto.

The novel features of our invention are set forth with more particularity in the accompanying claims. The invention itself, however, with respect to the details thereof, together with its additional objects and advantages, may be better understood from the following description of specific embodiments with reference to the accompanying drawings, in which:

Figure 1:
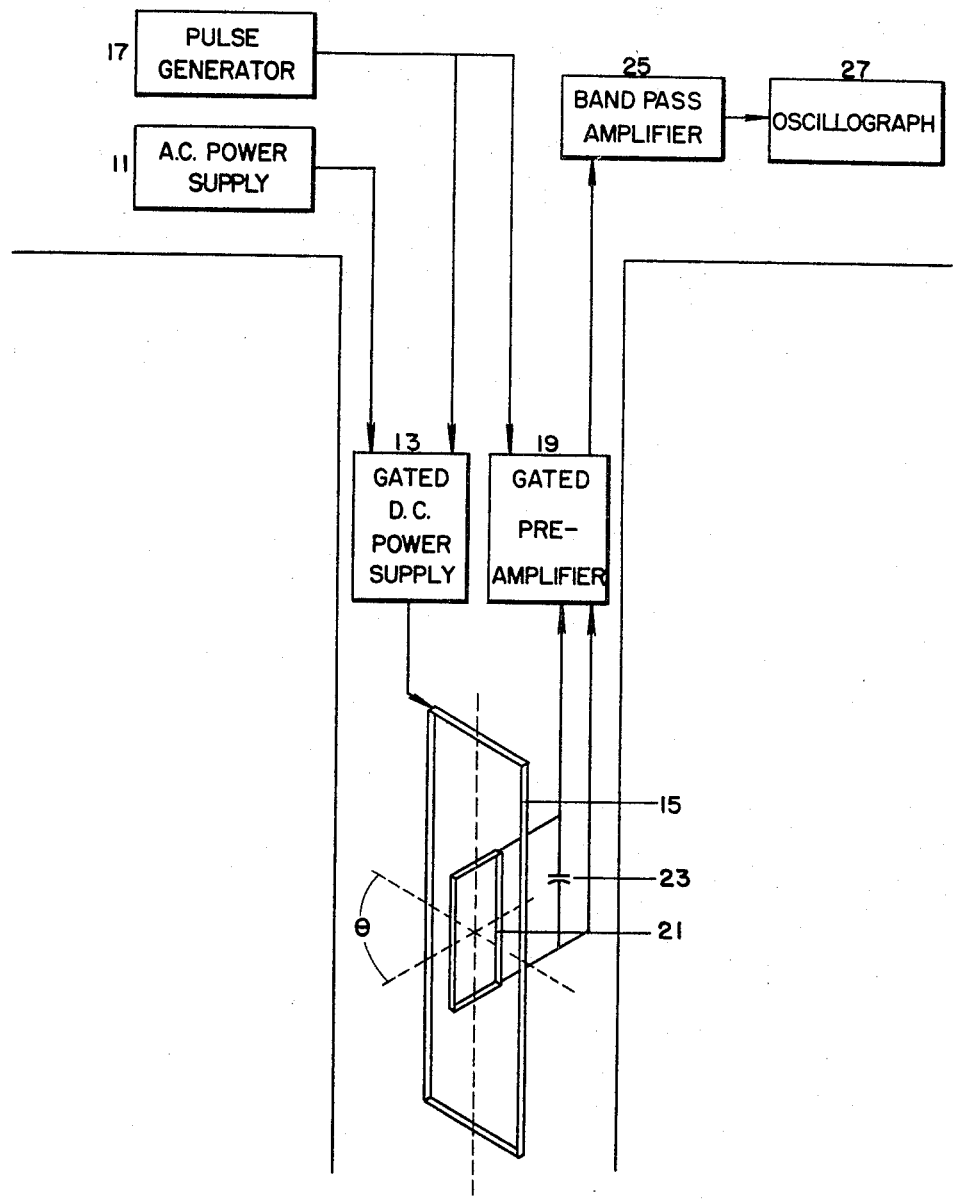
FIGURE 1 is a schematic diagram of an exemplary embodiment of a nuclear magnetic resonance relaxation time logger according to our invention.

As shown in FIGURE 1, a 110-volt, 60-cycle power supply 11 feeds into a gated DC power supply 13 which provides direct current to the polarizing coil 15. A pulse generator 17 controls the DC power supply 13 and the gated preamplifier 19. A detector coil 21 is connected in parallel with a capacitor 23 and feeds into the gated preamplifier 19. The preamplifier 19 feeds current through the band pass amplifier 25 to the oscillograph 27.

The pulse generator 17 generates a negative voltage square wave. It is adapted to be adjusted so that the duration of the negative pulse and of the interval between pulses from the generator 17 may be varied over a substantial range. The pulse generator is so connected into the preamplifier 19 that it gates the preamplifier 19. The pulse generator 17 is also connected to the gate DC power supply 13.

The gated DC power supply 13 may consist of a rectifier together with means for rapidly switching on and off the electrical current through the polarizing coil 21. Such switching means is described in Varian Patent 2,561,490, filed July 24, 1951, column 8, line 70, to column 9, line 17.

The current through the polarizing coil 15 sets up in the formation a magnetic filed which establishes a macroscopic nuclear magnetic moment with a component in the direction of the axis of the coil 15. If the magnetic field of the coil 15 is removed quickly enough, the macroscopic moment will precess about the earth's magnetic field. It is pertinent to our invention that the polarizing coil is designed to permit extremely rapid decay of the polarizing field as compared to the Larmor period of a proton in the earth's magnetic field. The coil has an inductance and distributed capacitance. When the source of current is removed from the coil an oscillating current appears in the coil. The natural frequency of this oscillating current depends on the inductance and capacitance of the coil. These are selected so that the natural frequency is much greater than the precessional or Larmor frequency of protons in the earth's magnetic field. The coil has a high Q-value, so that these oscillations are damped out very slowly. This oscillating current causes the polarizing field to be replaced quickly by an oscillating magnetic field, which oscillates through many cycles during the time of one precessional cycle. The time average of this field over a time of one precessional cycle is effectively zero. This oscillating field has essentially no effect on the precession of the nuclei, thus the polarizing field is effectively reduced to zero in a vary short time.

The gated preamplifier 19 is also controlled by the pulse generator 17 and is gated off until the DC polarizing field has reached zero. This is done to prevent the voltages induced in the detector coil by the switching of the polarizing coil from blocking the amplifier 25.

As soon as the DC polarizing field of the coil 15 is effectively zero, the nuclear signals are picked up by the tuned detector 21–23, amplified, and recorded on the oscillograph 27. The coil 21 detects the signal from precessing protons in a manner somewhat similar to the action of a transformer secondary. The angle $\theta$ between coil 21 and coil 15 may have an arbitrary value. When it is desired to minimize the signal induced in coil 21 by coil 15, $\theta$ should be equal to 90 degrees. The capacitor 23, in conjunction with coil 21, forms a tuned circuit. The oscillograph may be either a cathode ray oscilloscope, the face of which is photographed in order to record the signal on its face, or the oscillograph may be another type of recording instrument.

It is not necessary that coil 15 and coil 21 be physically separate coils. It is a simple matter for one skilled in the art to use one and the same coil for both polarization and detection purposes.

The operation of the apparatus descirbed with reference to FIGURE 1 will now be described. First, it is necessary to define relaxation time and present the scientific basis on which an analysis of the signal output of the above-described apparatus may be made.

When a magnetic field is applied externally to a sample, the rate at which the energy state of the nuclear magnetic moments reaches an equilibrium value is an exponential function of time denoted by $t$ and is characterized by the thermal relaxation time commonly denoted by $T_1$:

$$E = E_i + (E_t - E_i)(1 - e^{-t/T_1})$$

where E is the energy of the system of nuclear magnetic moments, $E_i$ is the initial energy of the system at the instant the external magnetic field is applied, and $E_t$ is the final equilibrium energy of the system of nuclear magnetic moments. When the nuclei are caused to precess in phase, a net macroscopic precessing nuclear magnetic moment arises. The precessing component of the macroscopic moment is gradually destroyed over a period of time by thermal motion of the nuclear moments and by the interaction of the nuclear magnetic moments among themselves at a rate that is an exponential function of time. The rate is characterized by the relaxation time T which is determined both by $T_1$, defined above, and by $T_2$, where $T_2$ characterizes the rate at which the precessing nuclei get out of phase because of the interaction of their nuclear magnetic moments.

$T_1$ and $T_2$ are characteristic of a particular hydrogenous fluid, being determined by viscosity, temperature, paramagnetic impurities, electronic magnetic fields, and interaction of nuclear magnetic moments. In particular, the protons in oil within the formation will have a different relaxation time T from that of the protons in water within the formation. A number of characteristic differences between oil and water are either concomitant with this effect or cause a change in the relaxation time. Oil, having a different chemical composition from water, tends to imbue its protons with a somewhat different relaxation time. Oil, having a higher viscosity than water, tends, for this reason, to be characterized by a shorter relaxation time. These considerations are characteristic of differences between oil and water in the pure form. Oil and water within the earth, however, contain a wide assortment of impurities. Paramagnetic impurities within a hydrogenous liquid tend to shorten the relaxation time of the protons therein. A very small quantity of paramagnetic impurity in the liquids has a gross effect on the relaxation time. Thus, the amount of paramagnetic impurity within the formation waters or crude oil may, at times, be the single determinant which determines whether oil or water will have the longer relaxation time.

A number of studies have been made of the variations in the quantity of various impurities in oil and water within the earth. Among the paramagnetic impurities in formation water, iron is usually the principal constituent and substantial amounts of manganese and chromium are common. In oil, vanadium is usually the principal paramagnetic impurity, while iron and nickel are important paramagnetic impurities. Analyses indicate that formation waters may have from less than one part per million paramagnetic impurity to one percent paramagnetic impurity. Oils have been analyzed to have from less than one part per million paramagnetic impurity to 100 parts per million. Paramagnetic impurities of less than 100 parts per million are sufficient to affect strongly the relaxation time of protons within the oil. A similar effect exists in water. Accordingly, if the formation water in a well which is tested by our nuclear resonance method has no measurable paramagnetic impurity while the oil within the formation adjacent to the same well has of the order of 100 parts per million, the oil will have a measurably shorter relaxation time. Conversely, if the water has a high concentration of paramagnetic impurities and the oil has less paramagnetic impurity, the protons in the water may have a measurably shorter relaxation time.

Waters from a number of oil fields in widely distributed geographical locations have been tested, and it is often possible before a well log is made to know whether the oil or water will have a greater concentration of paramagnetic impurities. If this difference in the concentration of paramagnetic impurities is great enough, the paramagnetic impurities themselves will determine which material will have the greater relaxation time and a log can be interpreted accordingly. If the concentration of paramagnetic impurity within the well is essentially the same for water and oil, oil will generally have the shorter relaxation time. Thus, on the basis of previous tests, such characteristics of the oil and water are measured in order that the nuclear resonance log may be interpreted as an indication whether the formation contains oil or water.

Nuclear magnetic resonance measurements may be used to identify and classify formation waters in particular geological zones and formations so that the nuclear magnetic resonance log may be used for correlating geological formations from bore hole to bore hole.

There will be no nuclear magnetic resonance of carbon or oxygen in the formation, since the angular momentum and magnetic moment of the nuclei of these two elements is zero. Solid substances not suspended in liquids within the formation will not provide a resonance signal sufficient to interfere with the nuclear resonance signal to which our present invention pertains. In some situations it might be difficult to differentiate oil or water in the drilling mud from that in the formation. Under those circumstances, it is advisable to introduce an amount of paramagnetic impurity into the drilling mud sufficient to greatly shorten the relaxation time of protons therein. Then, the signal from the precessing nuclei of the mud will decay so rapidly that it will be insufficient to interfere with the signal picked up from the precessing nuclei in the formation. Furthermore, the additive may be so chosen that the drilling fluid filtrate has a negligible relaxation time so that nuclear resonance signals from the zone of formation around the bore hole invaded by filtrate will give rise to signals from only crude oil and water originally in situ. Furthermore, if water base drilling mud is used, the additive can be so chosen that the signal from the crude oil remaining in the invaded zone is not influenced. Furthermore, if a paramagnetic additive is used in the drilling fluid that gives the filtrate a distinctive relaxation time or frequency shift (the phenomenon of frequency shift will be described later), the nuclear magnetic resonance log can be used to provide information on the porosity and permeability of the formation.

Porosity and permeability may be determined from a nuclear magnetism resonance log of a formation by analyzing the resonance signals derived from the formation for distinctive signals from inserted fluids. In this method, the drilling fluid, under pressure, is forced into permeable, penetrated formations as filtrate. Where the formations are not permeable, there will be little or no filtrate. A measure of the strength of the signal from the filtrate may then be related to the amount of filtrate fluid and therefore be a measure of the porosity of the permeable formation.

Prior art methods have disclosed the forcing of fluids into formations and the measurement of distinctive signals from these fluids as measures of porosity and permeability. Such systems are shown in U.S. Patent 2,268,627, D. Silverman, Well Logging, filed Oct. 6, 1939 and in U.S. Patent 2,443,680, G. Herzog, Method of Determining the Nature of Substrata, filed Apr. 4, 1944. These patents are representative of the art for pressurizing drilling fluids to force the fluid into the formation and the art of measuring a characteristic of the fluid in situ after it has entered the formation.

One fault of the prior art schemes is solved by the present method. That fault is noted in the Herzog patent where the possibility of signals from the formation materials obscuring the signals from the filtrate fluids is suggested. In that prior art problem it becomes necessary to impose careful control over the selection of filtrate additives.

In the method of the present invention the signals from formation materials and from filtrate materials is desired. These signals may be distinguished by distinctive relaxation time or frequency shift as well as by other distinctive characteristics of nuclear magnetic resonance signals. The signals will only be derived from hydrogen nuclei; those nuclei existing only in the form of water or oil in the formation. Distinguishing the signals can therefore indicate the presence of oil, formation water and filtrate water as well as establish the permeable character of the formation. The presence of a signal from the filtrate water may also be employed to evaluate formation porosity.

Figure 2:
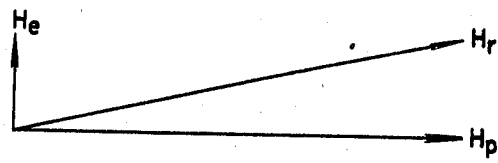
FIGURE 2 is a vector diagram of the macroscopic moment and the fields acting to orient the macroscopic moment.

In the practice of our invention, the earth's magnetic field, $H_e$, is employed as the external magnetic field. Protons within this field have ample time to align themselves in the direction of the field. Accordingly, relaxation time is not of interest in the mechanism of the original alignments. As indicated previously, a slightly larger number of the protons have been aligned in the direction of the field than have been aligned in the direction opposite to the field. If a second DC magnetic field is impressed on a sample at an angle with the earth's magnetic field, the resultant magnetic field, $H_r$, is at an angle to both the earth's magnetic field and the second magnetic field, $H_p$, as shown in FIGURE 2. Nuclei now tend to align themselves with the resultant magnetic field, $H_r$. The preponderance of nuclear magnetic moments aligned with the field $H_r$ gives rise to a changed orientation and magnitude of the macroscopic moment. The process of changing the macroscopic moment from the direction, $H_e$, to the direction $H_r$, is not immediate, but is given by the equation $$M = M_o(1 - e^{-t/T_1}) + M_e$$

where $M$ = the macroscopic moment vector in the direction of $H_r$
$M_o$ = a known vector = $X(H_r - H_e)$
$t$ = time
$M_e$ = vector component of macroscopic moment in the direction of the earth's field
$T_1$ = thermal relaxation time
$X$ = nuclear magnetic susceptibility of the interstitial fluids in the formation surrounding the bore hole After an interval of time, the protons reach a steady state where the macroscopic moment in the direction, $H_r$, is essentially equal to $M_o$, if, as will be the case in the operation of our invention, $H_p$ is much greater than $H_e$.

Figure 3:
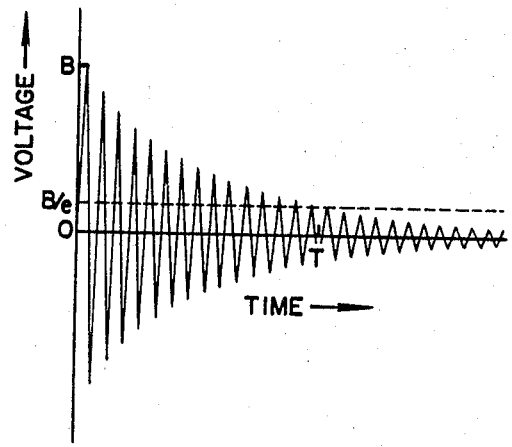
FIGURE 3 is a graph of signal voltage versus time for small nuclear resonance line splitting, narrow line width, and only one hydrogenous fluid.

When the field $H_p$ is removed, the macroscopic moment tends to align itself with $H_e$ and to be reduced to its original value $M_e$. If $H_p$ is removed quickly enough (in a time short compared to $1/\omega_L$, where $\omega_L$ is the Larmor frequency of a proton in the arth's magnetic field), then the macroscopic moment will precess about $H_e$. $1\omega_L$ is about one-twentieth of a millisecond for protons in $H_e$. $H_p$ may be about ten gauss while $H_e$ is of the order of one gauss. In order for precession to occur, $H_p$ must be reduced from 10 gauss to much less than one gauss in a time much less than one-twentieth of a millisecond. The pickup coil 21 in the vicinity of the sample is capable of detecting the precission of the macroscopic moment. As the macroscopic moment precesses, it tends to align itself with $H_e$ and the protons tend to assume a random position with respect to the plane perpendicular to the axis of precession. Due to these effects, the signal received by the pickup coil decreases according to the equation $V = Be^{-t/T}$, where:

$V$ = signal voltage
$B$ = an arbitrary constant
$T$ = relaxation time
$t$ = time FIGURE 3 shows a graph of $V$ versus $t$, of which the above equation gives the envelope. As discussed previously, the relaxation time, $T$, which appears in the above equation, depends on both the thermal relaxation time $T_1$ and the spin-spin relaxation time $T_2$, while the relaxation time which controls the time required for the protons to align themselves with the resultant field, $H_r$, is the thermal relaxation time.

The oscillograph records a signal such as that shown in FIGURE 3. The record shown in FIGURE 3 is interpreted as follows: a measurement is made of the peak to peak amplitudes are then correlated to obtain the constants in the equation $V = Be^{-t/T}$. In this equation, the constant $T$ is the quantity to be determined. This is the relaxation time. If the signal shows the combined effects of two relaxation times present simultaneously for a heterogeneous mixture of two different fluids, the signal is analyzed in a well-known manner for the values of the two relaxation times.

The above description of the manner of analyzing the record on the oscilloscope was based on operating the pulse generator 17 with off times of uniform lengths sufficient to permit time for the nuclei to align themselves with the resultant field $H_r$. By the above procedure, the signal decay relaxation time is measured. As an alternative, the polarization time may be measured. To measure the polarization time, the pulse generator is adjusted to emit pulses at intervals varying in a predetermined manner. The duration of each successive off time is greater than the duration of the previous off time by a discrete amount. The signal from the precessing nuclei is picked up by the coil 21 as before and recorded in the oscillograph. At the end of a very short pulse from the coil 15, the maximum amplitude of the signal picked up by the coil 21 is not as high as it would be when the magnetic moment in the direction $H_r$ has reached a high value. The longer the pulse is from the polarizing coil 15, the greater will be the maximum amplitude of the voltage recorded on the oscillograph 27. Thus, if a number of records are taken on the oscillograph which result from pulses of varying duration, data can be obtained from which one may plot a graph of maximum signal voltage versus polarizing time. From this graph the thermal relaxation time $T_1$ can be obtained. This quantity $T_1$ has the same usefulness in distinguishing water and oil in a formation as does the determination of the relaxation time which is measured after the DC power is turned off. The presence of two values of $T_1$ originating from crude oil and formation water may be determined, and the values of $T_1$ measured in a manner apparent from the method of determining $T$ set forth above.

The quality of the signal recorded on the oscillograph and its usefulness in determining the types of fluids in the formation are dependent in part on a depth to which the DC field of the polarizing coil 15 penetrates into the formation. It is important, therefore, that the coil 15 be of such a nature as to provide the maximum penetration consistent with establishing a detectable nuclear resonance signal. In our apparatus the polarizing coil is a flat rectangular coil of great length and of the maximum width consistent with bore hole size. Except at positions near the ends of the polarizing coil, the field due to this coil is nearly the same as that produced by two parallel wires of infinite length, i.e., its long dimension is great compared with the diameter of its field of polarization. This field drops off more slowly with distance from the coil than does the field of a circular winding. Our coil permits sampling deeper into the formation and gives a stronger nuclear resonance signal than a circular winding. The pickup coil has a length along the axis of the well less than the thickness of the thinnest structure that one seeks to identify. It must also be sufficiently shorter than the polarizing coil 15 to avoid end effects.

Figure 4:
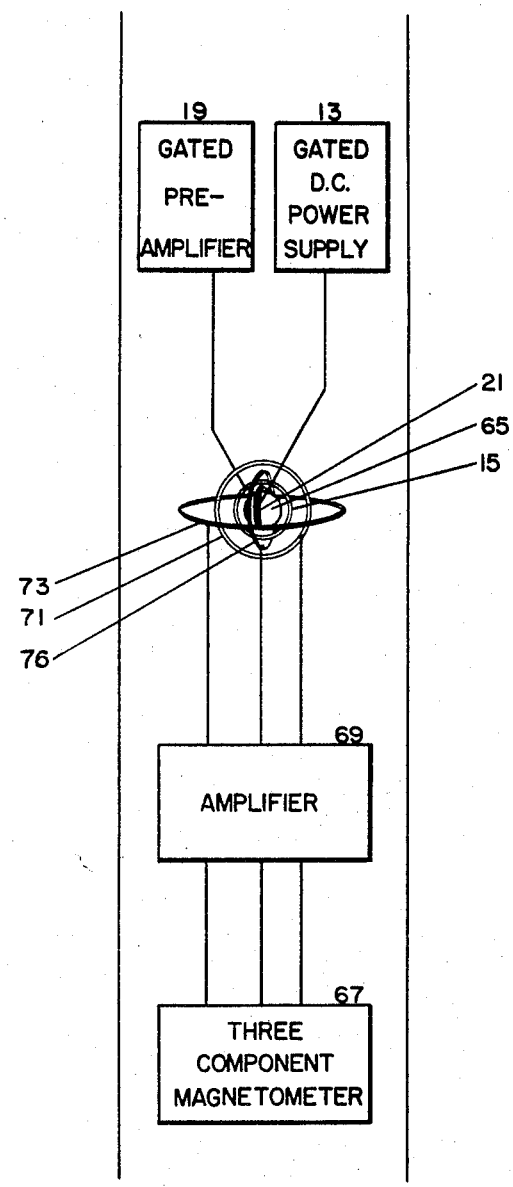
FIGURE 4 is a schematic diagram showing an exemplary embodiment of components of apparatus according to our invention in which a ferromagnetite core is used.

FIGURE 4 shows an alternative arrangement for the polarizing and pickup coils involving the use of a ferromagnetic core 65. The presence of the ferromagnetic core within the two coils greatly increases the field which the polarizing coil 15 sets up in the formation and similarly increases the responsiveness of the coil 21 to signals from the precessing nuclei. This ferromagnetic core is made of laminated or powdered material to minimize eddy current losses in it and to permit the eddy currents in it to decay rapidly when the polarizing current is turned off. Since our apparatus relies on the use of the earth's magnetic field, the ferromagnetic core introduces a problem since the presence of the ferromagnetic substance in the earth's magnetic field distorts the earth's field. This distortion is eliminated by the degaussing circuit shown in FIGURE 4. In the specific apparatus shown, a three-component magnetometer 67 is placed in the well, suspended from the coils 21 and 15, and spaced some distance from the coils. The three-component magnetometer measures the earth's magnetic field in the three mutually perpendicular directions. This measurement is indicated by a correction current from each of three coils within the magnetometer. The three correction signals are amplified in the amplifier 69 and passed to the coils 71, 73, and 76. These coils are wound around the magnetic core 65 and have mutually perpendicular axes. The gain of the amplifier is adjusted so that the three-component magnetometer provides exactly the right amount of current to the three degaussing coils 71, 73, and 76 for causing them to offset the distortion of the earth's magnetic field due to the presence of the magnetic core 65. Thus, as far as the earth's magnetic field is concerned, the core is not magnetic. However, the degaussing arrangement has no effect on the core's tendency to increase the magnetic field set up by the coil 15 and to increase the response of the coil 21 to the external signal from the processing nuclei. While the coil shown in FIGURE 4 is a circular coil, the presence of a ferromagnetic core within the coil so increases the field set up by the coil that the penetration of the polarizing field into the formation will be adequate to permit the detection of a measurable signal from the precessing nuclei.

Figure 5:
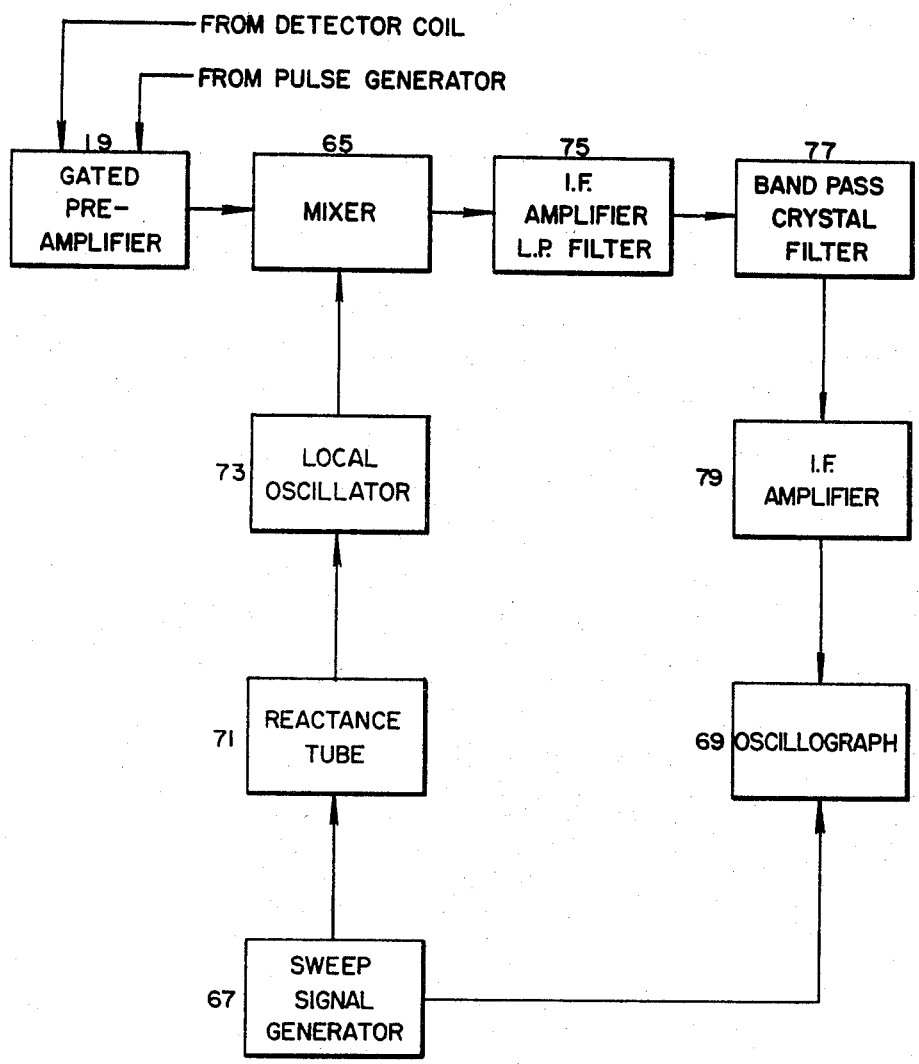
FIGURE 5 is a schematic diagram of certain components of apparatus according to our invention.

Certain components of an alternative circuit are shown in FIGURE 5. The elements of the circuit in FIGURE 5, that are not shown in FIGURE 1, are connected to the gated preamplifier 19 in place of the band pass amplifier 25 and oscillograph 27 shown in FIGURE 1. The remaining components of the apparatus shown in FIGURE 1 are employed with the remaining elements shown in FIGURE 5. The output of the preamplifier 19 is fed into a mixer 70. A sweep signal generator 68 generates a sawtooth wave which provides the horizontal sweep signal for the cathode ray oscillograph 69.

The sweep signal generator 67 feeds the same sawtooth wave into the reactance tube 71. The reactance tube 71 is in a circuit so arranged that variations in its control voltage input cause variations in its inductance or capacity. The reactance tube 71 forms a portion of the tank circuit of the local oscillator 73. By varying the impedance of the reactance tube 71, the frequency of the local oscillator 73 is varied. The local oscillator 73 is adjusted to have a frequency much greater than the Larmor frequency of the precessing protons. The sweep signal varies the frequency of the local oscillator 73 over a predetermined range, as, for example, 50 cycles. The mixer 70 is so arranged that its output has four frequency components:
(1) The frequency of the signal from the gated preamplifier.
(2) The frequency of the signal from the local oscillator.
(3) The sum of these two frequencies.
(4) The difference of the two frequencies.

This signal is fed into an intermediate frequency amplifier and low pass filter 75. The low pass filter is tuned to pass the difference frequency and lower frequency signals, and the I.F. amplifier is tuned to pass the difference frequency. The output of the amplifier and filter 75 is fed into the band pass crystal filter 77.

The crystal filter 77 is tuned to pass a narrow band of frequencies of the order of one cycle per second. The output of the crystal filter 77 is amplified in the I.F. amplifier 79 and fed into oscillograph 69.

Thus, it is seen that the signals from the gated preamplifier are heterodyned in the mixer stages and the difference frequency is extracted and amplified by the I.F. amplifier and low pass filter 75.

During the continuous sweeping of the local oscillator through a predetermined frequency range, the various frequency components of the proton resonance signal in the preamplifier 19 can be made to appear at the output of the narrow band filter at successive time intervals. The frequency of the local oscillator 73 and the position of the horizontal sweep on the oscillograph 69 are synchronized so that each horizontal position of the sweep on the oscillograph represents a specific frequency for the local oscillator and, accordingly, represents a specific frequency from the I.F. amplifier corresponding to the frequency of the local oscillator 73. The components 75, 77, and 79 are tuned for a single frequency during an entire logging operation. For a signal to appear on the oscillograph 69, the frequency output of the preamplifier 19 must be such that the difference between this frequency and one frequency of the output of the local oscillator 73 falls within the band pass of the filter 77. If such a signal appears, its appearance will be at a position on the face of the oscilloscope which will indicate its frequency. If two separate frequencies within the proper range are emitted by preamplifier 19, these will appear in two short pulses on the face of the oscilloscope separated by a distance determined by their frequency differences. If the signal output of the gated preamplifier 19 is included in a frequency range within the range for which the display apparatus is adjusted, the signal appearing on the face of the oscillograph will have a duration proportional to the frequency range of the output signal of the preamplifier 19.

The above described apparatus determines precisely the frequency of precession of the protons within the formation adjacent to the pickup coil 21. There are several frequency configurations which, according to our invention, may be detected by the pickup coil and analyzed to distinguish water and oil. While the pickup coil receives a signal only from the precession of protons, the precessional frequency varies according to the environment of the nuclei which are precessing. The field at a particular nucleus is a combination of the external field, in which the sample containing the nucleus is positioned, and a local field at the nucleus. This local field is determined by the magnetic fields of adjacent positive and negative particles.

The atoms within a single molecule often interact so that the local field at a nucleus may be different from the field at another nucleus due to the difference in the molecular structure or due to the difference in location within a molecule of a given atom. The formula for water is H—O—H. Thus the hydrogen atom is adjacent to an oxygen atom. Oil, on the other hand, contains a wide variety of organic molecules, many of which have a hydrogen atom adjacent to a carbon atom, while other hydrogen atoms are adjacent to other types of atoms. Since the local field at the nuclei of the hydrogen atoms varies in dependence upon the position of the hydrogen atom within the molecule, there are distinctly different Larmor frequencies for various protons positioned differently within a molecule.

As mentioned above, each proton in the water molecule has the same Larmor frequency. If more than one frequency is detected by the circuit shown in FIGURE 5, it is clear that one of the frequencies results from a substance other than water. This other substance may be interpreted as being oil. The appearance of a pair of frequencies in the nuclear resonance signal of protons in the same molecule is called line splitting.

Oil within the ground contains a number of hydrocarbons and impurities. Accordingly, the protons of oil in the ground may have a series of Larmor frequencies closely grouped together. Furthermore, the Larmor frequency of any particular proton may vary from time to time. The net result of these effects is a characteristic termed line broadening. An indication on the oscilloscope 69 of a particular line breadth may be indicative of the presence of oil.

In summary, then, a number of characteristics may appear under different circumstances from a frequency analysis of the precession of protons in the formation adjacent to a well bore. Line broadening, line splitting, and the appearance of two discrete frequencies indicate the presence of oil. Further, if a well logging instrument at the upper part of a well bore indicates a first precessional frequency, while the well logging instrument later in another portion of the well bore registers a second precessional frequency, it may be concluded that the precessional frequency detected lower in the bore hole may be indicative of the presence of oil.

While we have described specific embodiments of our invention, we fully understand that many modifications and variations thereof may be made in the light of the teachings therein presented. We do not intend, therefore, to limit our invention except as set forth in the appended claims.

We claim:
1. In a method for measuring porosity and permeability within the formation adjacent to a well bore, the improvement comprising the steps of introducing into said well bore a drilling fluid to provide a drilling fluid filtrate having a distinctive nuclear gyromagnetic resonance characteristic, impressing a magnetic field of predetermined strength and uniformity on said formation from within said well bore to polarize protons in said filtrate within said formation, said field being directed at an angle to the earth's magnetic field within said formation, interrupting said impressed magnetic field to initiate precession of said polarized protons about the earth's magnetic field, and detecting signals having said distinctive nuclear gyromagnetic resonance characteristics in precession signals derived from said precessing protons to provide data relating to the porosity and permeability of said formation.

2. The method of claim 1 wherein said filtrate contains a paramagnetic additive to give said filtrate a distinctive nuclear gyromagnetic resonance characteristic and wherein said detected signals are signals having a distinct frequency shift due to said additive in said filtrate to derive data relating to the porosity and permeability of said formation.

References Cited

UNITED STATES PATENTS 2,443,680  6/1948  Herzog _____ 250—83.6

RUDOLPH V. ROLINEC, *Primary Examiner.*

MICHAEL J. LYNCH, *Assistant Examiner.*